United States Patent [19]

Faatz

[11] Patent Number: 4,816,691
[45] Date of Patent: Mar. 28, 1989

[54] DEVICE FOR THE EVALUATION OF RADIO PHOTOLUMINESCENT GLASSES

[75] Inventor: Hein Faatz, Erlangen, Fed. Rep. of Germany

[73] Assignee: FAG Kugelfischer Georg Schafer (KGaA), Fed. Rep. of Germany

[21] Appl. No.: 130,003

[22] Filed: Dec. 8, 1987

[30] Foreign Application Priority Data

Dec. 9, 1986 [DE] Fed. Rep. of Germany ....... 3641949

[51] Int. Cl.$^4$ .............................................. G01T 1/105
[52] U.S. Cl. .................................................. 250/484.1
[58] Field of Search ...................... 250/484.1 C, 473.1, 250/327.2 A

[56] References Cited

U.S. PATENT DOCUMENTS 4,507,562 3/1985 Gasiot et al. ...................... 250/473.1

Primary Examiner—Carolyn E. Fields
Attorney, Agent, or Firm—Ostrolenk, Faber, Gerb & Soffen

[57] ABSTRACT

A measurement apparatus for measuring and evaluating the latent photoluminescence present in a radio photoluminescent (RPL) glass which has been irradiated by gamma or x-ray radiation. The latent photoluminescence is measured by irradiating the glass by ultraviolet light and by measuring the resulting photoluminescence that emanates from the glass. In addition to the conventional measurement components which include one measurment branch for measuring the photoluminescence emitted from the glass and a second measurement branch for measuring the magnitude of the light emitted from the ultraviolet source there is provided an auxiliary common light source, the light of which is coupled, via a an optical beam splitter, to the first and second measurement branches. By using a single, common auxiliary light source, measurement inaccuracies that otherwise result from dark currents and parameter drifting in the first and second measurement systems are factored out.

15 Claims, 1 Drawing Sheet

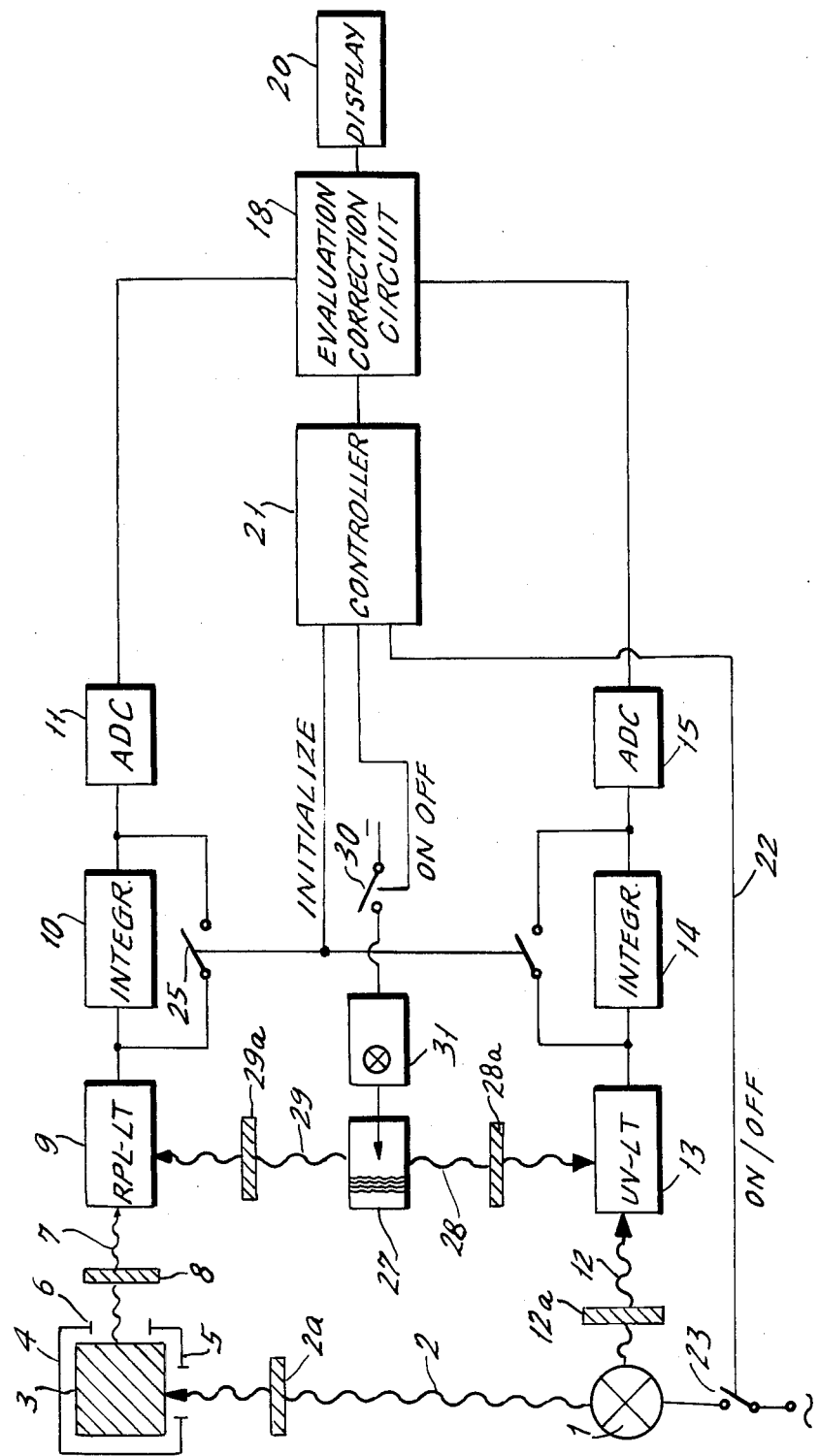

DEVICE FOR THE EVALUATION OF RADIO PHOTOLUMINESCENT GLASSES

BACKGROUND OF THE INVENTION

The present invention relates to a measurement system that produces a more precise measurement of the latent radiation that is stored in a radio photoluminescent (RPL) glass which has been irradiated by gamma or similar radiation. The radiation stored in the RPL glass is released in the form of photoluminescence by irradiating the glass with ultraviolet light. The measurement system captures and processes the emitted photoluminescence and displays it.

Measurement systems of the type referred to above are known from German Patent No. 27 44 020. In one known system, a source of ultraviolet light is used to excite the RPL glass to cause it to emit a luminescent radiation the intensity of which is representative of the dosage of gamma or x-ray radiation which is stored in the RPL glass.

Although known radiation measuring systems account for and/or eliminate errors that may result from variations in the light level that is emitted from the source of ultraviolet light, the known systems are nevertheless prone to errors which arise from drifting parameters in light transducers and in integrators that are invariably present in systems of this type. To overcome the above-mentioned disadvantages, Federal Republic of Germany Patent No. 27 45 080 and Federal Republic of Germany laid-open application No. OS 27 45 081 have proposed to include a highly stable reference light source in each of the two light measurement branch circuits that are typically present in a system of the type referred to herein.

Nonetheless, a problem remains. The problem arises from the coupling of an individual reference light source in each measurement branch circuit. There are always minute undetectable variations in the outputs of any two light sources, even highly stable light sources. Negative or positive excursions in the outputs of the reference light sources may not always cancel one another. In fact, these undesirable output excursions associated with the light sources may, at times, reinforce one another, producing significant skewing and worsening of the measurement errors. The magnitude of the errors attributable to the reference light sources can reach values close to 50% of actual measurement values.

SUMMARY OF THE INVENTION

It is an object of the present invention to provide a photoluminescence measuring system which yields very precise measurement results.

It is a further object of the present invention to provide a photoluminescence measuring system which avoids the disadvantages of similar prior art systems.

It is a further object of the invention to provide a photoluminescence measuring system which avoids the problems which arise from using separate light sources in each of the two measuring branches of the system.

The foregoing and other objects of the present invention are realized with a measuring system which includes a source of ultraviolet radiation and an RPL glass for being irradiated by the source of ultraviolet radiation. The measuring system comprises a first measuring branch for measuring photoluminescence. The first measuring branch includes a transducer for receiving photoluminescence emitted by the RPL glass and for converting it into an electrical signal, an integrator for integrating the electrical signal, and an analog to digital converter (ADC) for converting the integrated signal from an analog to a digital signal.

The measuring system further includes a second measurement branch provided for measuring the output magnitude of the ultraviolet light source. The second branch includes an ultraviolet transducer for receiving and converting the ultraviolet radiation into a representative electrical signal and an integrator for integrating the electrical signal. An analog to digital converter receives the integrated analog signal and converts that signal into a digital signal representative of the magnitude of the ultraviolet radiation.

The photoluminescence transducer and the ultraviolet transducer are each further coupled, via an optical beam splitter, to an auxiliary and common light source. The ultraviolet light source or the auxiliary light source are capable of being turned on and off or connected to the transducers under control of a controller circuit. Digital signals from the first and second analog to digital converters obtained during several measurement phases, are received, stored and processed in an evaluation circuit. The evaluation circuit combines the measurement results obtained during each measurement phase and produces a highly accurate output which is representative of the photoluminescence issuing from the RPL glass.

Other features and advantages of the present invention will become apparent from the following description of a preferred embodiment of the invention which is described below in reference to the drawing of the invention.

BRIEF DESCRIPTION OF THE DRAWING

The sole FIGURE of the invention depicts a block diagram of a measurement system according to the present invention.

DETAILED DESCRIPTION OF A PREFERRED EMBODIMENT

A source of ultraviolet radiation 1 is disposed to illuminate a radio photoluminescent (RPL) glass 3 with ultraviolet light that is directed along line 2 and which passes through an ultraviolet filter 2a. The RPL glass 3 may be arranged in any desired manner within a measurement chamber 4 which is shaped to prevent stray light from entering into measurement chamber 4, while allowing entry of filtered ultraviolet light through an aperture 5.

As is well known, a radiation/luminescence is stored in RPL glass 3, in response to the irradiation of RPL glass 3 with gamma or x-ray beams. The stored radiation can be excited and released from RPL glass 3 with the exposure of RPL glass 3 to ultraviolet light issuing from ultraviolet source 1. The stored radiation is released as a luminescence which leaves measurement chamber 4 via a second aperture 6. The luminescent light of RPL glass 3 impinges upon an orange filter 8 which permits only light in the orange-to-red wavelength region to pass therethrough.

The filtered luminescent light, identified by reference numeral 7, is received by a luminescence transducer 9, for example, a secondary electron multiplier. The transducer 9 converts the received light to an electrical signal and that signal is coupled to an integration stage 10, consisting essentially of an amplifier for amplifying the electrical signal 10, an integration stage for integrating the signal and a storage device for storing the integrated signal. The analog integrated signal of integration stage 10 is coupled to an analog-to-digital converter 11 which converts the signal to a digital signal. The above-described circuits constitute a first measurement branch for measuring the integrated magnitude of the photoluminescent light emanating from the RPL glass 3. The first branch includes at least elements 9, 10 and 11.

A second measurement branch is provided for measuring the integrated magnitude of the radiation issuing from ultraviolet source 1. The second measurement branch includes an ultraviolet light transducer 13 which is coupled to ultraviolet radiation from light source 1 and an ultraviolet filter 12a which is positioned in the radiation line 12. The filter 12a possesses the same characteristics and parameters as the ultraviolet filter 2a which is disposed in front of measurement chamber 4.

Ultraviolet light transducer 13 converts the received radiation into an electrical signal and that electrical signal is coupled to an integration stage 14. Like the integration stage 10 of the first measurement branch, integration stage 14 is constituted of an amplifier, an integrator and a storage device. Further, the stored analog signal issuing from the integration stage 14 is coupled to a second analog-to-digital converter 15 which converts that signal to a digital format.

The digital outputs of the two analog-to-digital converters 11 and 15 are supplied to an evaluation and correction stage 18 where the digital signals are stored and used for carrying out certain calculations. A display device 20 is connected to evaluation and correction stage 18 for purposes which are well known to those skilled in the art.

A program/control circuit 21 is also coupled to the evaluation and correction stage 18, its function being to, among other things, selectively enable or disable the ultraviolet light source 1 by means of the connection line 22 and the switch 23. Similarly, the program control circuit 21 is effective for selectively enabling/disabling, during certain measurement phases, the auxiliary light source 31 by controlling the state of switch 30.

Program control circuit 21 has the additional function of zeroing/initializing the memories of integration stages 10 and 14 through connection line 24 and switches 25 and 26, associated respectively with integrator stages 10 and 14. Zeroing takes place after completion of the storing of the measurement values and other functions associated with each measurement phase. For example, zeroing/initialization of certain operational amplifiers that are contained in integration stages 10 and 14 can be easily accomplished by short-circuiting the inputs and outputs of these operational amplifiers.

In a first measurement phase, the ultraviolet light source 1 is enabled and the magnitude of the emission from RPL glass 3 is measured in the first branch while the magnitude of the ultraviolet light is measured in the second measurement branch.

The program control stage 21 provides a second measurement phase during which ultraviolet light source 1 is disabled and auxiliary light source 31 is enabled. Light from auxiliary light source 31 is then directed to beam splitter 27 comprised of glass fiber strands which provides a first beam of radiation 29 which impinges on orange filter 29a and received in photoluminescence transducer 9. A second beam of radiation 28 from beam splitter 27 impinges upon a blue filter 28a which passes filtered light to ultraviolet transducer 13.

Accordingly, there are produced, in the second measurement phase, a first measurement which is obtained by means the first measurement branch and a second measurement which is obtained by means of the second measurement branch. These measurement values are stored in evaluation and measurement stage 18.

Furthermore, program control circuit 21 provides a third measurement phase in which both ultraviolet light source 1 and auxiliary light source 31 are both disabled. The third measurement phase is instrumental for identifying and measuring the zero-point quiescent deviations of the first and second measurement branches which are caused by dark currents in the transducers 9 and 13 as well as by drifting effects that occur in the amplifier and integrator stages of both measurement branches. These quiescent measurement values are similarly stored in the evaluation and measurement stage 18. The carrying out of the calculations and measurements during the above mentioned measurement phases is facilitated by maintaining the durations of all measurement phases constant.

The measurement values that are obtained during the foregoing procedures are processed, for example, by a microprocessor which is programmed to obtain a quotient which is derived from solving a set of equations. The quotient is transferred to display device 20, but only after it is processed/adjusted by reference to a dosage-dependent linearization factor $K1_{(fD)}$, a temperature correction factor $K2_{(f)}$ and a calibration factor $K3$ (see Equation 3 below).

The calculations are based on the following three equations.

$$\frac{((RPL + RPL_o) - RPL_o)}{((H \cdot A_{RPL} + RPL_o) - RPL_o)} \cdot \qquad \text{(Equation 1)}$$

$$\frac{((H \cdot A_{UV} + UV_o) - UV_o)}{((UV + UV_o) - UV_o)} = Q$$

$$\frac{RPL}{UV} \cdot \frac{H \cdot A_{UV}}{H \cdot A_{RPL}} = Q \qquad \text{(Equation 2)}$$

$$A = Q \cdot K1_{(fD)} \cdot K2_{(f)} \cdot K3 \qquad \text{(Equation 3)}$$

Equation 2 shows that the quotient Q is independent of the magnitude (H) of the light that is emitted by the auxiliary light source 31, so long as (H) is a nonzero value.

In equations 1, 2 and 3 above:

$RPL_o$ represents the dark and offset currents associated with photoluminescence transducer 9 and integrator stage 10.

$UV_o$ represents the dark and offset currents of ultraviolet light transducer 13 and integrator stage 14.

RPL represents the value of the luminescent light current.

UV is the value of the ultraviolet light current.

H is the value of the auxiliary light current.

$A_{RPL}$ represents the transfer factor of the circuit branch which includes auxiliary light source 31, beam splitter 27, photoluminescent transducer 9, integrator stage 10 and analog-to-digital converter 11.

$A_{UV}$ represents the transfer factor of the circuit branch consisting of auxiliary light source 31, beam splitter 27, ultraviolet light transducer 13, integrator stage 14 and analog-to-digital converter 15.

Q represents the ratio of the ultraviolet excitation light to the luminescent light, the ratio being independent of variations in the first and second light measurement branches and in the auxiliary light source 31.

$K1_{(D)}$ represents the dosage-dependent correction value.

$K2_{(t)}$ represents the temperature-dependent correction value.

K3 represents a normalized calibration factor.

A represents the calibrated, linearized and temperature-compensated measurement value of the radiation dosage.

Tests that were carried out with a system in accordance with the present invention have shown that, under practical conditions, changes in light intensity in the auxiliary light source 31 ranging from minus 50% to plus 100% did not produce any discernible influences on the final measurement results.

Accordingly, the present invention enables the replacement, as a light source, of the mechanically sensitive incandescent lamps which have unsatisfactory short lives, with semiconductor based light-emitting diodes (LED) having suitable wavelengths (yellow or green). The semiconductor based devices are mechanically sturdy and their relatively inferior light variation and aging characteristics can be ignored since they have no effect on the measurement precision of the measurement system that is constructed in accordance with the present invention. Moreover, the ability of semiconductor based devices to operate in harsh environments which produce vibrations, mechanical shocks and sudden changes in temperature, significantly enhances the value of the measurement system of the present invention.

Although the present invention has been described in relation to a specific embodiment thereof many other variations and modifications and other uses will now become apparent to those skilled in the art. It is therefore preferred that the present invention be limited not by the specific disclosure herein but only by the appended claims.

What is claimed is:

1. A measuring system for measuring a latent photoluminescence present in a radio photoluminescent glass, the system comprising:
   an ultraviolet light source for producing ultraviolet radiation for impinging on a radio photoluminescent (RPL) glass;
   a first measurement branch for measuring photoluminescent light emitted from the RPL glass in response to irradiation of the RPL glass by the ultraviolet radiation and a second measurement branch for measuring the magnitude of the ultraviolet radiation;
   the first measurement branch including a photoluminescence light transducer disposed for detecting the photoluminescent light emitted from the RPL glass, the photoluminescence light transducer being effective for converting the received light to a first electrical signal;
   the second measurement branch including an ultraviolet light transducer for converting a portion of the ultraviolet light emitted from the ultraviolet light source to a second electrical signal representative of the magnitude of the ultraviolet light;
   an auxiliary light source and means for coupling light emitted from the auxiliary light source to both the photoluminescence light transducer and to the ultraviolet light transducer; and
   first means for selectively enabling the ultraviolet light source or the auxiliary light source and for collecting measurement values from the first and the second measurement branches and for producing an output which is representative of a dosage of radiation stored in the RPL glass.

2. A measuring system as in claim 1 in which the first means includes:
   an evaluation and measurement circuit coupled to an effective for storing and evaluating the first and second electrical signals; and
   a controller coupled to the ultraviolet light source and to the auxiliary light source and effective for selectively enabling and disabling the light sources, the evaluation and measuring circuit being operable in conjunction with the controller for evaluating the first and second electrical signals and additional signals obtained from the first and second measurement branches to produce the output which is representative of the dosage of radiation stored in the RPL glass.

3. A measuring system as in claim 1, in which the first measurement branch further includes a first integrator stage coupled to the photoluminescence light transducer for integrating the first electrical signal to obtain a first analog integrated signal and a first analog-to-digital converter for converting the analog integrated signal into a first digital signal; and wherein the second measurement branch further includes a second integrator stage coupled to the ultraviolet light transducer for integrating the second electrical signal to obtain a second analog integrated signal and further including a second analog-to-digital converter for converting the second analog integrated signal into a second digital signal.

4. A measuring system as in claim 3, in which each of the first and second integrator stages includes a respective amplifier stage for amplifying the electrical signal received by the integrator stage.

5. A measuring device as in claim 4 in which the coupling means associated with the auxiliary light source comprises an optical beam splitter.

6. A measuring system as in claim 5, in which the optical beam splitter is comprised of glass fiber strands.

7. A measuring system as in claim 2 in which the coupling means associated with the auxiliary light source comprises an optical beam splitter.

8. A measuring system as in claim 2, further including a first switch coupled to the auxiliary light source and controllable by the controller to selectively enable or disable the auxiliary light source.

9. A measuring system as in claim 8, further including a power supply for the auxiliary light source, the first switch being disposed between the power supply and the auxiliary light source and being effective for disabling the auxiliary light source by interrupting the flow of power from the power supply to the auxiliary light source.

10. A measuring system as in claim 1, in which the auxiliary light source comprises a semiconductor device.

11. A measuring system as in claim 10, in which the semiconductor device is a light emitting diode.

12. A measuring system as in claim 11, in which the light emitting diode is effective for producing a light wavelength in the yellow range.

13. A measuring system as in claim 11, in which the light emitting diode is effective for producing a light wavelength in the green range.

14. A measuring system as in claim 2, in which the auxiliary light source comprises a semiconductor device.

15. A measuring system as in claim 14, in which the semiconductor device is a light emitting diode.

* * * * *